United States Patent
Steadman

(10) Patent No.: US 6,230,369 B1
(45) Date of Patent: May 15, 2001

(54) TIE ARRANGEMENT

(76) Inventor: William David Steadman, 111-4800 SE. Federal Hwy., Stuart, FL (US) 34997

(*) Notice: Subject to any disclaimer, the term of this patent is extended or adjusted under 35 U.S.C. 154(b) by 0 days.

(21) Appl. No.: 09/392,197

(22) Filed: Sep. 8, 1999

(30) Foreign Application Priority Data

Sep. 8, 1998 (GB) .................................. 9819434

(51) Int. Cl.⁷ .................................................. B65D 63/10
(52) U.S. Cl. .......................................... 24/16 PB; 24/25
(58) Field of Search .................. 24/16 R, 17 A, 24/16 PB, 30.5 R, 30.5 P, 25, 17 AP; 248/74.3

(56) References Cited

U.S. PATENT DOCUMENTS

| | | | |
|---|---|---|---|
| 134,052 | * | 12/1872 | Gurley . |
| 3,149,808 | * | 9/1964 | Weckesser . |
| 3,197,829 | * | 8/1965 | Caveney et al. . |
| 3,258,819 | * | 7/1966 | Weckesser . |
| 3,300,825 | * | 1/1967 | Andreasen . |
| 3,494,002 | * | 2/1970 | Kabel . |
| 3,900,922 | * | 8/1975 | McCormick . |
| 3,909,884 | * | 10/1975 | Weckesser . |
| 4,128,220 | | 12/1978 | McNeel ................................. 248/60 |
| 4,399,593 | * | 8/1983 | De Bradandere et al. . |

FOREIGN PATENT DOCUMENTS

| | | |
|---|---|---|
| 1217470 | 12/1970 | (GB) . |
| 1257204 | 12/1971 | (GB) . |

* cited by examiner

Primary Examiner—James R. Brittain
(74) Attorney, Agent, or Firm—Watts, Hoffmann, Fisher & Heinke Co., L.P.A.

(57) ABSTRACT

A tie arrangement (10) comprising a housing (12) with a passage (16), an engagement part (22) and an elongate member (14), the free end of the elongate member (14) being extendable through the passage (16), the engagement part (22) and a locking member (18) being arranged inside the passage (16) for locking the elongate member (14) inside the passage (16), such that if said elongate member (14) is pulled, this causes the engagement part (22) to move together with the elongate member (14), which causes clamping of the elongate member (14) between the engagement part (22) and the passage walls (16) by virtue of the decreasing size of the passage (16), thereby preventing further movement of the elongate member (14).

11 Claims, 1 Drawing Sheet

TIE ARRANGEMENT

Tie arrangements which can be formed into a loop of a required size are used in a wide range of applications. Such applications can be used for mounting cables or hoses on fittings, or tying together a number of wires or cables etc. Conventional arrangements tend to exhibit a number of disadvantages. One of these is that the free end tends to extend at right angles to the fixed end from the locking block and thus making it untidy, and if the free end is cut this tends to provide an upstanding and sharp projection. Conventional ties often cannot be joined together if a larger tie is required, and if this is possible do not tie together neatly in a parallel arrangement. Many types of ties cannot be re-used.

According to the present invention there is provided a tie arrangement, the arrangement comprising a housing with a through passage extending from a first end to a second end, and decreasing in size towards the second end; an elongate member extending from the first end, the free end of the elongate member being extendable through the passage from the second end such that the elongate member defines a loop of a required size; and a locking member within an engagement part locatable in the passage, the locking member being arranged such that if the elongate member is pulled from the second end this causes the engagement part to move with the elongate member towards the second end which causes clamping of the elongate member between the engagement part and the passage walls by virtue of the decreasing size of the passage, thereby preventing further movement in said direction.

The parts of the engagement part and/or the elongate member which engage during clamping, may have roughened surfaces.

The arrangement is preferably such that when the elongate member is clamped, if the free end thereof is pulled from the first end of the housing this releases the clamping by virtue of movement of the engagement part towards the first end, and thereby permits the loop to be decreased in size.

The locking member preferably comprises a flexible member which extends from the first end of the housing, and which member mounts the engagement part.

The flexible member preferably extends beyond the engagement part to provide a retaining part which is arranged such that when beyond the second end of the housing the retaining part cannot be pulled therethrough at least when in a relaxed condition.

The retaining part is preferably arranged such that when beyond the second end, the retaining part can be pushed towards the second end to release any clamping of the elongate member, and permit the elongate member to be moved through the housing in either direction.

The retaining part is preferably arranged to pass through the second end of the housing when pushed from the first end.

The retaining part is preferably resilient and arranged such that when compressed it can pass through the second end of the housing in either direction, and may be arranged so as to automatically be compressed when pushed towards the second end from the first end.

The retaining part may comprise a resilient part which is inclined through greater than 90° relative to the longitudinal direction of the flexible member so as to point back towards the second end of the housing when the flexible member extends through and beyond the housing.

The engagement part preferably comprises a member which extends laterally from the flexible member. The engagement member preferably decreases in size towards one end thereof, which end when the locking member is located in the housing from the first end thereof, points towards the second end thereof.

The housing and/or the engagement member preferably only decrease in size in one direction and preferably in a direction parallel to the longitudinal direction of the passage.

The housing and/or engagement member preferably have a wedge shape cross-section, and the inclination of the wedge shape of the housing and engagement member is preferably substantially identical.

The elongate member is preferably substantially planar, and preferably the housing and/or engagement member decrease in size in a direction substantially perpendicular to the plane of the elongate member.

The locking member is preferably integrally formed.

The arrangement may be integrally formed. The arrangement may be made of plastics material.

An embodiment of the present invention will now be described by way of example only and with reference to the accompanying drawings, in which.

Figure 1:
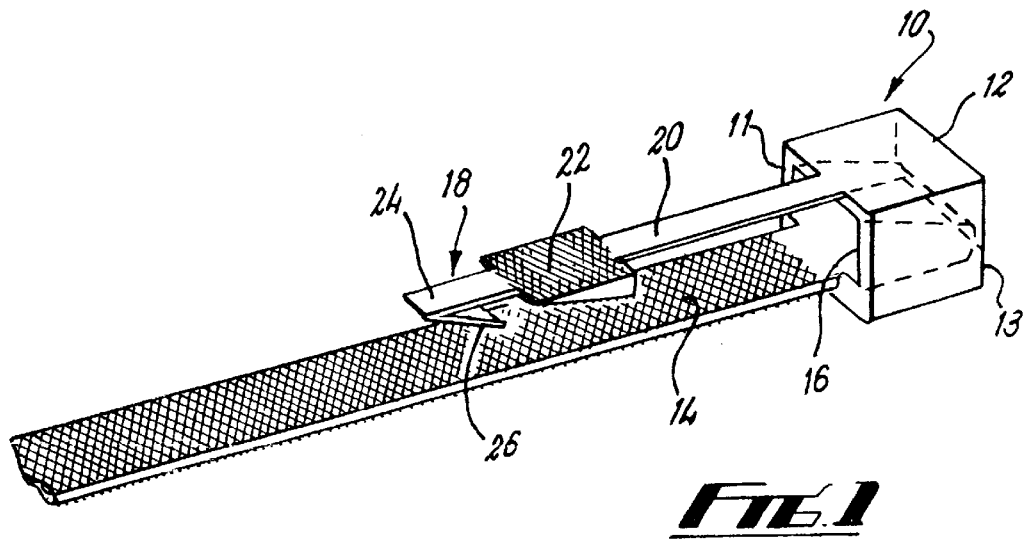
FIG. 1 is a diagrammatic perspective view of a tie arrangement according to the invention in a first condition.

The drawings show a tie arrangement 10 which is integrally formed from plastics material. The arrangement 10 comprises a rectangular housing 12. An elongate strip 14 extends from a first side 11 of the housing 12. A passage 16 extends through the housing 12 from the first side 11 to an opposite second side 13. The passage 16 decreases in height towards the second side 13. The strip 14 extends from immediately beneath the opening of the passage 16 at the side 11 as shown in FIG. 1. The top surfaces of the strip 14 and the member 22 have a roughened surface to provide grip therebetween, for a purpose which will be hereinafter described.

Extending from immediately above the passage 16 at the side 11 is a locking member 18. The member 18 comprises a connecting strip 20 which is narrower than the strip 14. The strip 20 connects to an engagement member 22 in the form of a wedge shaped projection which narrows away from the housing 12 as shown in FIG. 1. The member 22 has a similar inclination to the reducing of the height of the passage 16 and is of a size to slidingly fit in the passage 16 leaving a space therebeneath substantially equal to the thickness of the strip 14.

A yet further strip 24 of a similar width to the strip 20 extends from the narrow end of the member 22. The free end 26 of the strip 24 is inclined back to point towards the member 22 and also downwards towards the strip 14 as shown in FIG. 1.

Figure 2:
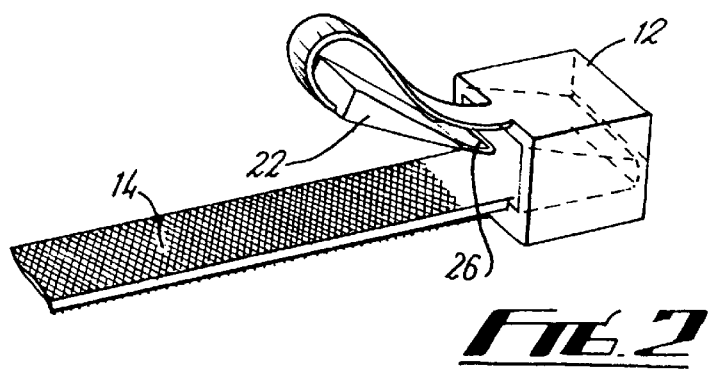
FIG. 2 is a similar view to FIG. 1 with the arrangement being moved to a second condition.
Figure 3:
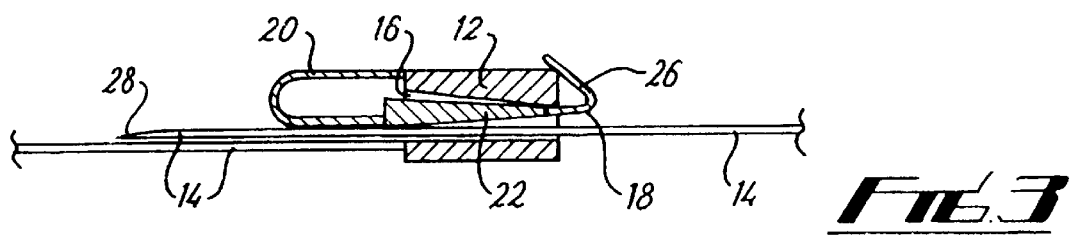
FIG. 3 is a diagrammatic cross-sectional side view of the arrangement of FIG. 1 in use in a second condition.
Figure 4:
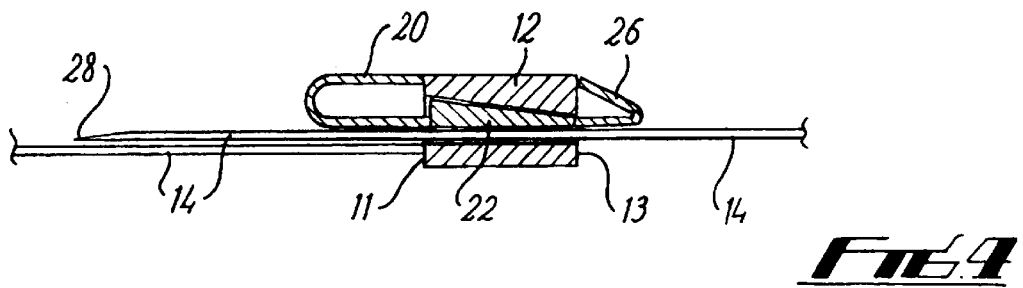
FIG. 4 is a similar view to FIG. 3 but with the arrangement encountering a pulling action.

FIG. 1 shows the arrangement 10 in a relaxed condition, but for use the member 18 requires to be threaded back through the passage 16 such that the free end 26 is fully clear of the passage 16 as shown in FIGS. 3 and 4. FIG. 2 shows the connecting strip 20 being bent to permit the free end 26 to be pushed through the passage 16. With the free end 26 beyond the passage 16 the member 22 locates therein. The free end 26 will deform to pass through the passage 16 at the second side 13.

The strip 14 can now be bent into a loop, being bent downwardly as shown in the drawings, and threaded back through the passage 16 beneath the member 18. As the free end 28 of the strip 14 passes beneath the member 22 it will urge the member 18 to the left as shown in FIG. 3 thereby providing sufficient space beneath the member 22 for the strip 14 to be pulled to a required position. As the free end 26 of the strip 24 is bent back this will engage on the outside of the housing 12 as shown in FIG. 3 to prevent the member 22 being pulled to the left beyond a short distance.

If the strip 14 is pulled to the right of the housing 12 as shown in FIGS. 3 or 4, as would be the case if the loop was being tightened. The roughened surface of the strip 14 would cause the member 22 to move to the right as shown in FIG. 4. As the passage 16 reduces in height this causes clamping of the strip 14 between the member 22 and the floor of the passage 16 and therefore the strip 14 cannot be moved any further. If it is required to release the tie 10, this can be achieved by compressing the free end of the strip 24 and pushing it backwards through the passage 16.

There is thus described a tie arrangement with a relatively simple construction but which works efficiently and provides for a number of advantages. The free end of the strip comes into a parallel alignment with the end thereof which extends from the housing. This provides for a much neater arrangement. In many instances it will not therefore be necessary to cut-off the free end of the strip. If this is though required no sharp or unsightly upstanding projection will be left remaining. The arrangement can readily be released. The arrangement can be locked at any position. Such arrangements can readily be joined together to form larger ties if these are required. As the free end extends parallel to the beginning of the strip, there is no resistance to tightening by virtue of bending of the strip as is often encountered in conventional ties.

Various modifications may be made without departing from the scope of the invention. Whilst the locking member is illustrated in a relaxed condition not extending through the housing, it could be supplied already extending through the housing. In such a condition it may be arranged such that it cannot be fed back through the housing. The free end could be arranged such that if it is pushed hard against the housing this will permit the strip to be released to permit sliding thereof through the housing. The engagement member could be differently shaped as could the passage. It may be that only the passage reduces in size towards one end. The arrangement could be such that the locking arrangement did not extend from the same side of the housing as the beginning of the strip.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A unitary reversible plastic tie comprising:
   a) a housing having a through passage defined by tapering walls extending from a relatively large end opening to a smaller and spaced end opening;
   b) a flexible tie strap projecting from and connected to the housing near the large end opening;
   c) the tie strap including a free end remote from the housing connection, the free end being insertable into the passage through the smaller end opening for moving the strap from an extended free position to a position extending the strap through the passage and projecting from the large end opening whereby the strap defines an article encircling loop;
   d) a wedge shaped engagement member connected to the housing by a strip, the engagement member having surfaces to complementally engage said walls and the strap when the strap projects through the passage;
   e) a free end part projecting from the engagement member opposite the strip, the free end part projecting from the smaller end opening when the wedge engagement member is in strap retention engagement; and,
   f) the free end part being adapted to transmit release force to the engagement member to release said retention engagement whereby to permit removal of the strap from the passage and return to the extended free position.

2. A tie according to claim 1, wherein at least one of said engagement member and said strap includes engaging parts for engaging during retention engagement, said engaging parts are roughened surfaces.

3. A tie according to claim 1, wherein said tie is such that when said strap is in strap retention engagement, if said strap free end is pulled from said larger opening, the retention engagement will be released by virtue of movement of said engagement member towards said large end, and thereby permits said loop to be decreased in size.

4. A tie arrangement according to claim 1, wherein said free end part is formed from resilient material and is arranged such that when compressed said part can pass through said small end opening in either direction.

5. A tie arrangement according to claim 4, wherein said free end part is compressed when said part is pushed towards said smaller end opening from said large end opening.

6. A tie arrangement according to claim 4, wherein said part includes a resilient portion which is inclined through greater than 90° relative to the longitudinal direction of the remainder of the part so as to point back towards said smaller end opening when said strap extends through and beyond said housing.

7. A tie according to claim 1, wherein said free end part includes a portion extending laterally from the remainder of the part.

8. A tie according to claim 1, wherein the inclinations of said housing walls and said engagement member are substantially identical.

9. A tie arrangement, said tie arrangement comprising:
   a) a housing, said housing including a first end and a second end and a passage extending from said first end to said second end of said housing, said passage decreasing in size towards said second end, said passage being defined by passage walls;
   b) an elongate member extending from said first end, said elongate member having a free end extendable through said passage from said second end such that said elongate member defines a loop of a required size;
   c) the housing further including an engagement part and a locking member, said engagement part being locatable in said passage and arranged such that if said elongate member is pulled from said second end this causes said engagement part to move with said elongate member towards said second end which causes clamping of said elongate member between said engagement part and said passage walls by virtue of the decreasing size of said passage, thereby preventing further movement in response to such pulling;
   d) said locking member being a flexible member which extends from said first end of said housing and mounts said engagement part;
   e) said engagement part further including a retaining portion extending beyond a wedging portion of said engagement part, said retaining portion being arranged such that, when beyond said second end of said housing, said retaining portion cannot be pulled through the second end at least when in a relaxed condition; and, f) said retaining portion comprises resilient material and being arranged such that when compressed said part can pass through said second end of said housing in either direction.

10. A tie arrangement according to claim 9, wherein said retaining portion comprises means for automatically compressing said retaining portion when said retaining portion is pushed towards said second end from said first end.

11. A tie arrangement according to claim 9, wherein said retaining portion comprises a resilient part which is inclined through greater than 90° relative to the longitudinal direction of the remainder of said retaining portion to point back towards said second end of said housing when said locking member extends through and beyond said housing.

* * * * *

UNITED STATES PATENT AND TRADEMARK OFFICE
CERTIFICATE OF CORRECTION

PATENT NO. : 6,230,369 B1  Page 1 of 1
DATED : May 15, 2001
INVENTOR(S) : William David Steadman It is certified that error appears in the above-identified patent and that said Letters Patent is hereby corrected as shown below:

Column 3,
Line 55, delete "reversible" and substitute "reusable"

Signed and Sealed this

Twenty-seventh Day of August, 2002

Attest:

Attesting Officer

JAMES E. ROGAN
Director of the United States Patent and Trademark Office